United States Patent

Aoki et al.

[11] Patent Number: 5,842,656
[45] Date of Patent: *Dec. 1, 1998

[54] SPINNING REEL HAVING IMPROVED ROTARY BALANCE

[75] Inventors: Atsuhito Aoki; Kotaro Yasuda, both of Fuchu, Japan

[73] Assignee: Ryobi Limited, Japan

[*] Notice: This patent issued on a continued prosecution application filed under 37 CFR 1.53(d), and is subject to the twenty year patent term provisions of 35 U.S.C. 154(a)(2).

[21] Appl. No.: 705,010

[22] Filed: Aug. 29, 1996

Related U.S. Application Data

[63] Continuation of Ser. No. 161,940, Dec. 3, 1993, abandoned.

[30] Foreign Application Priority Data

| Dec. 4, 1992 | [JP] | Japan | 4-083734 |
| Jan. 29, 1993 | [JP] | Japan | 5-002167 |
| Mar. 19, 1993 | [JP] | Japan | 5-012492 |

[51] Int. Cl.⁶ ................................. A01K 89/01
[52] U.S. Cl. ............................................ 242/231
[58] Field of Search ........................ 242/230, 231, 242/232, 233

[56] References Cited

U.S. PATENT DOCUMENTS

| 4,389,027 | 6/1983 | Sazaki et al. | 242/233 |
| 5,301,898 | 4/1994 | Ban et al. | 242/233 |
| 5,350,129 | 9/1994 | Furomoto et al. | 242/231 |
| 5,362,012 | 11/1994 | Ban | 242/321 |
| 5,379,957 | 1/1995 | Furomoto et al. | 242/230 |

FOREIGN PATENT DOCUMENTS

| 0 585 947 | 3/1994 | European Pat. Off. | 242/230 |
| 42 15 788 | 11/1992 | Germany | 242/231 |
| 42 18 013 | 12/1992 | Germany | 242/230 |
| 05-280887 | 6/1977 | Japan . | |
| HEI4127167 | 11/1992 | Japan . | |
| 5-23080 | 2/1993 | Japan | 242/231 |
| 5-23081 | 2/1993 | Japan | 242/231 |
| 5-38246 | 2/1993 | Japan | 242/231 |
| 5-137485 | 6/1993 | Japan | 242/231 |
| 6-125682 | 5/1994 | Japan | 242/231 |
| 6-125683 | 5/1994 | Japan | 242/231 |
| 6-197670 | 7/1994 | Japan | 242/231 |
| 2 257 880 | 1/1993 | United Kingdom | 242/230 |

*Primary Examiner*—Katherine Matecki
*Attorney, Agent, or Firm*—Brooks & Kushman P.C.

[57] ABSTRACT

A spinning reel has a rotary frame which is rotated around a spool and has two support arms for supporting a bail arm via a bail arm holder and a bail arm lever. In order to improve static and dynamic balances of the rotary frame, the bail arm holder is supported on the support arm so that a portion, on the opposite side of the bail arm in its winding position with respect to a reference plane of the bail arm holder is heavier than a portion, on the side of the bail arm of the bail arm holder, balancing means are integrally provided on the rotary frame, or the support arms are extended obliquely with respect to the reference plane.

4 Claims, 13 Drawing Sheets

SPINNING REEL HAVING IMPROVED ROTARY BALANCE

This is a continuation of application Ser. No. 08/161,940, filed on Dec. 3. 1993, now abandoned.

BACKGROUND OF THE INVENTION

This invention relates to a spinning reel, and more particularly to a spinning reel in which the rotary center axis of a rotary frame is not deviated from its regular position when the rotary frame is rotated.

A fishing rod with an attached spinning reel is commonly used by a fisherman to cast a lure affixed to an end of a fishing line to a location some distance away.

In a conventional spinning reel, a rotary frame is provided on the main body of a reel so as to be rotated by a crank handle, and a spool is disposed at the forward portion of the reel main body to wind fishline thereon. The rotary frame has a pair of support arms whose ends hold the ends of a bail arm swingably extended around the outer periphery of the spool. When the fishline is played out from the spool, the bail arm is swung to a play out position. When the fishline is wound around the spool, the bail arm is turned to a winding position and the rotary frame is rotated by operating the crank handle.

However, in the above conventional spinning reel, since the curved bail arm is provided, on only one side of the rotary frame with respect to the center axis of the rotary frame, at the front ends of the support arms via rotatable a bail arm lever and a bail arm holder for holding the ends of the bail arm when the fishline is wound on the spool, the rotational center axis of the rotary frame is deviated in a swinging manner from its regular position.

Further, since the bail arm is fixed to the support arms via the bail arm lever and holder, the existence of the lever and holder also causes the deviation of the rotational center axis of the rotary frame.

In order to ensure the static balance of the rotary frame in its diametric direction, the support arms for supporting the curved bail arm are disposed in a deviated manner from the center axis of the rotary frame. That is, as shown in FIGS. 14 and 15, a longitudinal sectional plane e which passes the centers of two pivot pins 8, 8 of the bail arm holder 3 on a support arm 2a and the bail arm lever 5 on a support arm 2b and is parallel with the center axis o of the rotary frame 1 is determined away, on the opposite side of a bail arm 4, by a distance (offset distance) $d_0$ from a plane a which passes the center axis o and is parallel with the plane e. The rotary frame 1 has a cylindrical portion 9 on which a spool 10 is slid in the axial direction of the rotary frame 1. In the above conventional spinning reel, the bail arm holder 3 for directly holding one end of the bail arm 4 has the center of gravity C at a position near a plane b which passes the centers of the pivot pins 8, 8 and is perpendicular to the plane a, on the side of the bail arm 4 with respect to the plane a. That is, each distance between the center of gravity c and the plane b is rather short ($f_0$). That is, the combined center of gravity in a group comprising the bail arm lever 5, the line roller 6 and the line slip 7 is located further from the center of the pin 16, 20 than the center of gravity c of bail arm holder 3. Therefore, the distance $f_0$ has to be determined longer in order to maintain the dynamic balance in the axial direction of the rotary frame 1. The bail arm 4 is swung over the front end of the spool 10 moving for a certain stroke to the played out position in which a fishline is played out from the spool 10 from the winding position, shown in FIG. 15, in which the fishline is wound up on the spool 10. The longer the deviated distance $d_0$ becomes, the longer the bail arm 4 becomes. If the bail arm 4 becomes longer, it is deformed easily. If the deviated distance $d_0$ becomes longer, strain is apt to generate on the cylindrical portion of the rotary frame 1 and the support arms 2a, 2b thereof when the rotary frame 1 is manufactured.

Further, as shown in FIGS. 16 and 17, the center of gravity $M_1$ in a group comprising the upper parts of the bail arm lever 5 and holder 3 and the support arms 2a, 2b on the opposite side of the bail arm 4 with respect to the plane a, a roller 6 and a line slip 7 of the rotary frame and the center of gravity $M_2$ in a group comprising the bail arm 4 and the lower parts of the bail arm lever 5 and holder 3 and the support arms 2a, 2b on the side of the bail arm 4 thereof are located at two positions different from each other thereby to be out of dynamic balance in the longitudinal or axial direction of the rotary frame 1. Therefore, some weights as balancers are provided on proper positions of the rotary frame 1. However, the weights make the rotary frame heavy and the number of parts is increased. The balancers make projections on the rotary frame 1, so that the fishline is sometimes caught thereon.

SUMMARY OF THE INVENTION

It is an object to provide a spinning reel which is well-balanced in both of the diametric and axial directions of the rotary frame of the spinning reel to prevent the rotational center of the rotary frame of the spinning reel from deviating from its regular position without any weight as a balancer.

According to one aspect of this invention, there is provided a spinning reel which comprises: a main body of the spinning reel; a rotary frame rotatably provided on the main body; a bail arm which is pivotably mounted on a pair of support arms provided on the rotary frame so as to be swung between a winding position in which a fishline is wound on a spool and a played out position in which the fishline is played out from the spool; and a bail arm holder pivotably provided on one support arm for supporting one end of the bail arm, the bail arm holder being so disposed that a portion of the bail arm holder on opposite side of the bail arm in the winding position with respect to a first plane which passes a center axis of the rotary frame and is parallel to a second plane which passes two centers of pivot points of the bail arm holder and a bail arm lever pivotably provided on the other support arm for supporting the other end of the bail arm and is parallel to the center axis of the rotary frame is heavier than a portion of the bail arm holder on the same side as the bail arm in the winding position with respect to the first plane.

According to another aspect of this invention, there is provided a spinning reel which comprises: a main body of the spinning reel; a rotary frame rotatably provided on the main body; a bail arm which is pivotably mounted on a pair of support arms provided on the rotary frame so as to be swung between a winding position in which a fishline is wound on a spool and a played out position in which the fishline is played out from the spool; a pair of bail arm holding members such as a bail arm lever pivotably provided on one support arm for supporting one end of the bail arm and having a line roller and a line slip and a bail arm holder pivotably provided on the other support arm for supporting the other end of the bail arm; and balancing means integrally provided on the rotary frame so that a combined center of gravity in a group comprising the bail arm, the balancing means and portions of the bail arm holding members and the two support arms on side of the bail arm in the winding position with respect to a first plane which includes a center axis of the rotary frame and is parallel to a second plane which passes two centers of pivot points of the bail arm holding members and is parallel to the center axis of the rotary frame is located on the same plane perpendicular to the center axis of the rotary frame as that on which a combined center of gravity in a group comprising portions of the bail arm holding members and the two support arms on opposite side of the bail arm in the winding position with respect to the first plane.

According to still another aspect of this invention, there is provided a spinning reel which comprises: a main body of the spinning reel; a rotary frame rotatably provided on the main body; a bail arm which is pivotably mounted on a pair of support arms provided on the rotary frame so as to be swung between a winding position in which a fishline is wound on a spool and a played out position in which the fishline is played out from the spool; and a pair of bail arm holding members such as a bail arm lever pivotably provided on one support arm for supporting one end of the bail arm and having a line roller and a line slip and a bail arm holder pivotably provided on the other support arm for supporting the other end of the bail arm, the support arms being extended obliquely on opposite side of the bail arm in the winding position with respect to a first plane which passes a center axis of the rotary frame and is parallel to a second plane which passes two centers of pivot points of the bail arm holding members and is parallel to the center axis of the rotary frame so that a combined center of gravity in a group comprising the bail arm, and portions of the bail arm holding members and two support arms on side of the bail arm in the winding position with respect to the first plane is located on the same plane perpendicular to a center axis of the rotary frame as that on which a combined center of gravity in a group comprising portions of the bail arm holding members and the two support arms on opposite side of the bail arm with respect to the first plane.

Further objects, features and other aspects of this invention will be understood from the following detailed description of the preferred embodiments of this invention with reference to the drawings.

DESCRIPTION OF THE PREFERRED EMBODIMENTS

First of all, a first embodiment will now be explained.

Figure 1:
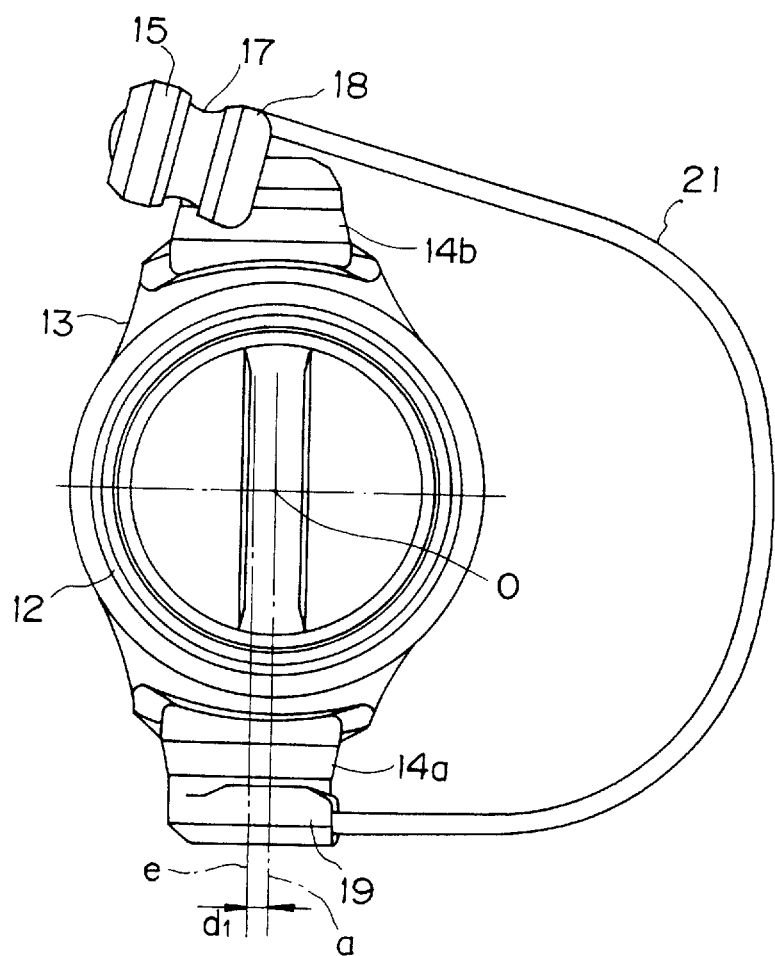
FIG. 1 is a front view of a spinning reel according to the present invention.
Figure 2:
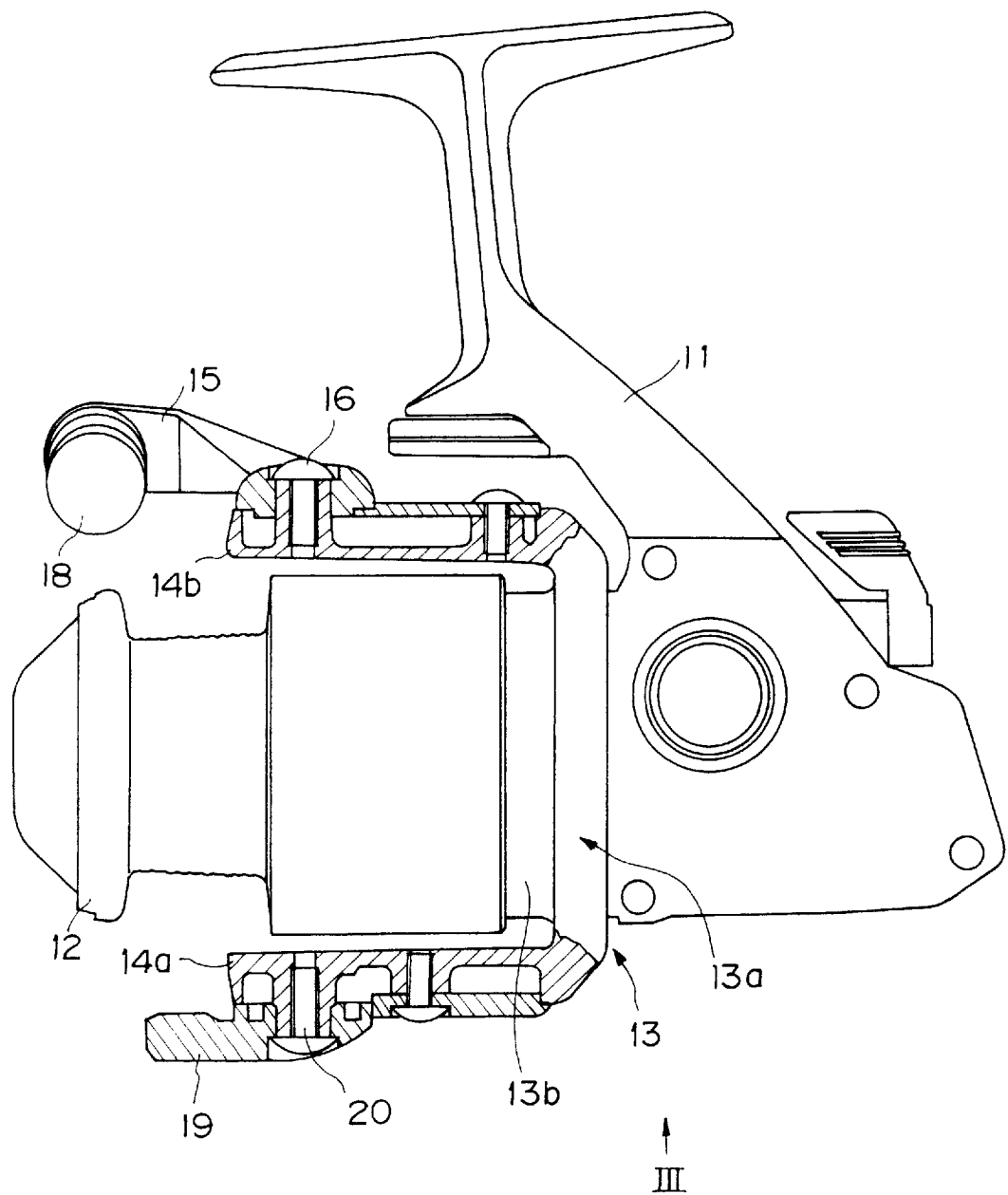
FIG. 2 is a side view of the spinning reel shown in FIG. 1.
Figure 3:
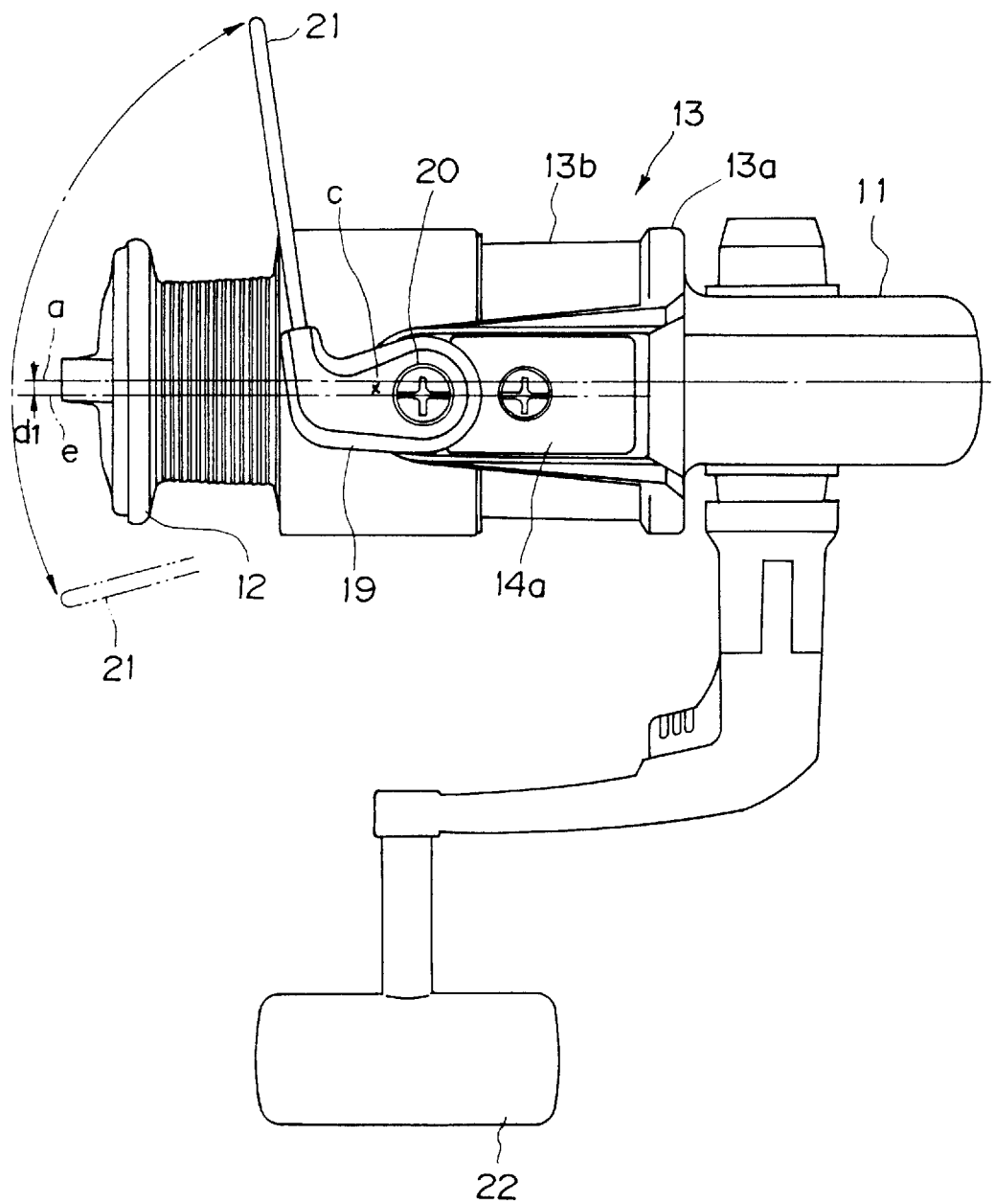
FIG. 3 is a plan view of the spinning reel shown in FIGS. 1 and 2.

A spring reel has, as shown in FIGS. 1 to 3, a main body 11 fixed to a fishing rod (not shown), a spool 12 held at the forward portion of the main body 11 so as to be movable in the forward and backward directions, and a rotary frame 13 provided on the main body 11 so as to be rotatable around the spool 12. The rotary frame 13 comprises a flange portion 13a and a cylindrical portion 13b on which the spool 12 is slidably moved and a pair of support arms 14a, 14b extended forward from the flange portion 13a along the periphery of the cylindrical portion 13b. One 14b of the support arms has, at its forward end, a bail arm lever 15 pivoted by a pivot pin 16. The bail arm lever 15 has a roller 17 and a line slip 18 for guiding the fishline. The other support arm 14a has, at its forward end, a bail arm holder 19 via a pivot pin 20. A bail arm 21 is bridged between the two support arms 14a, 14b via the bail arm lever 15 and the bail arm holder 19. One end of the bail arm 21 is connected to the line slip 18 and the other end of the bail arm 21 is directly connected to the front end of the bail arm holder 19. The bail arm lever 15 and holder 19 form two bail arm holding members.

When the bail arm 21 is set in a winding state wherein an operator can wind the fishline around the spool 12, a crank handle 22 is rotated to rotate the rotary frame 13 about its rotational center axis o (FIG. 1), so that the support arms 14a, 14b and the bail arm 21 rotates around the spool 12 to wind the fishline therearound while the spool 12 is moved for a predetermined distance (stroke) in the forward and backward directions.

Figure 4:
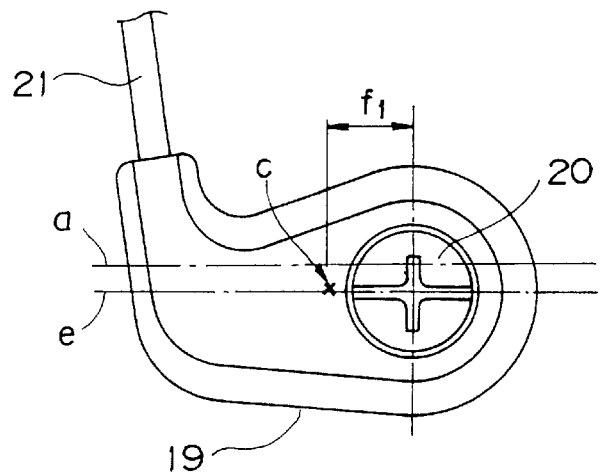
FIG. 4 is a front view of a bail arm holder according to the present invention.
Figure 5:
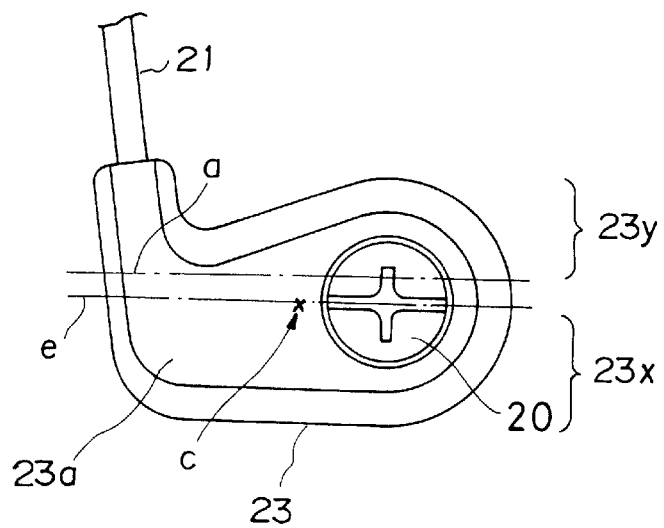
FIG. 5 is a front view of another bail arm holder.
Figure 6:
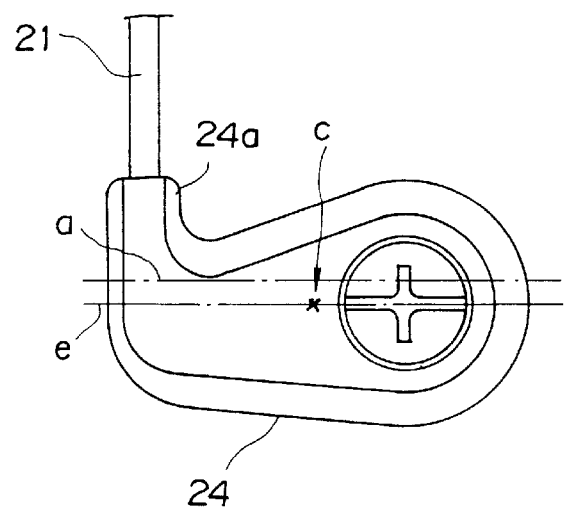
FIG. 6 is a front view of still another bail arm holder.
Figure 7:
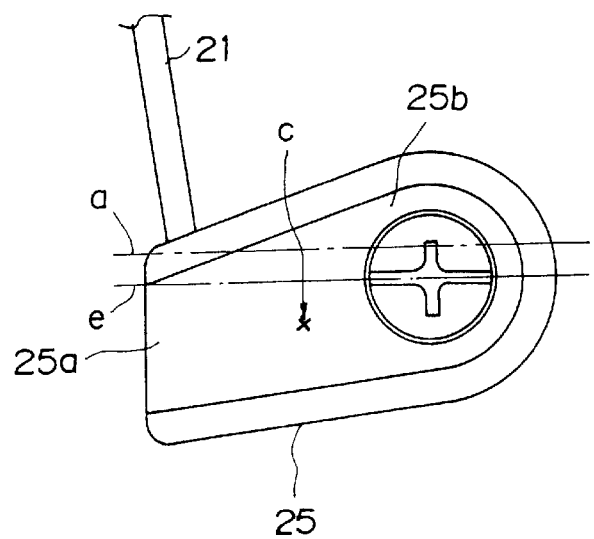
FIG. 7 is a front view of still another bail arm holder.
Figure 15:
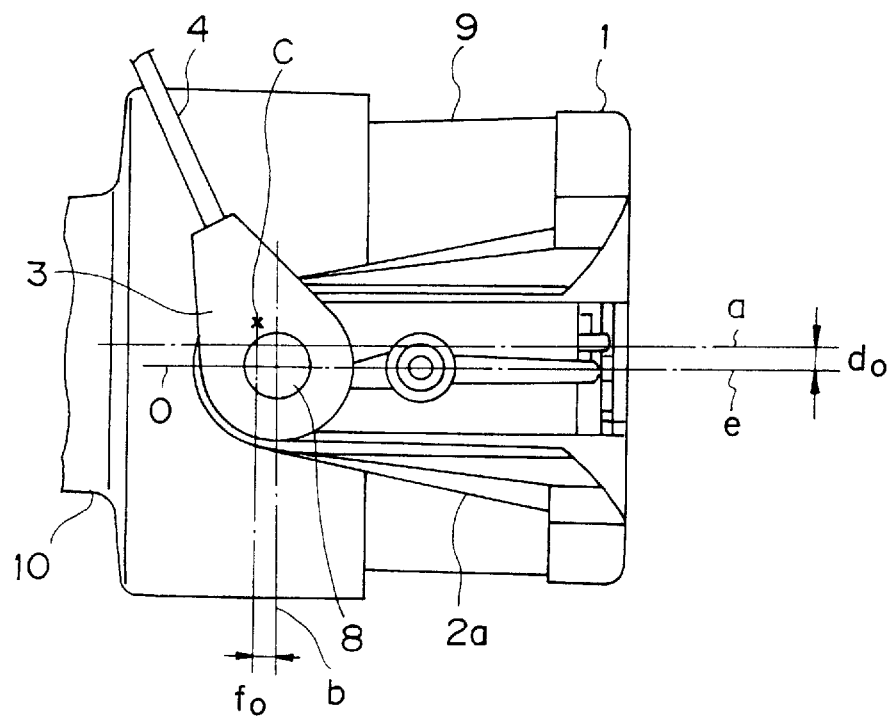
FIG. 15 is a side view of the conventional spinning reel shown in FIG. 14.
Figure 16:
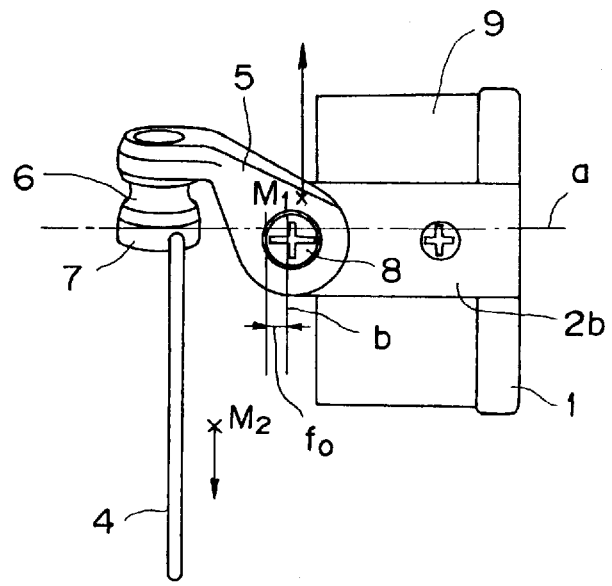
FIG. 16 is a side view of a conventional rotary frame.
Figure 17:
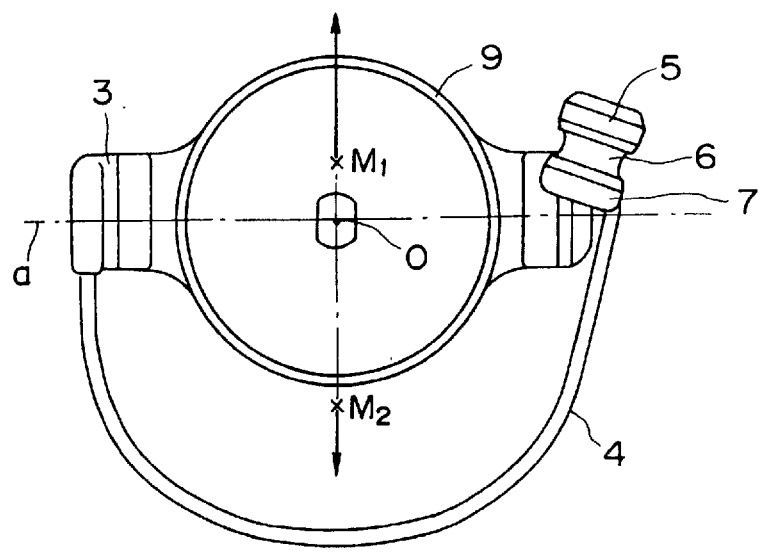
FIG. 17 is a front view of the conventional rotary frame shown in FIG. 16.

In order to balance the rotary frame 13 during rotation, a longitudinal sectional plane e which passes the centers of the pivot pins 16, 20 provided on the support arms 14a, 14b and extends parallel to the center axis o of the rotary frame 13 is deviated, on the opposite side (hereafter referred to as the antibail side) of the bail arm 21 in the winding state, by a distance $d_1$ between a plane a (reference plane a) which passes the center axis o and is parallel to the plane e. The distance $d_1$ is an offset distance. The bail arm holder 19 is, as shown in FIG. 4, extended forward from the pivot pin 20 along the longitudinal sectional plane e. The center of gravity c of the bail arm holder 19 is located on or near the longitudinal sectional plane e. The distance $f_1$ between the pin 20 and the center of gravity c is determined longer than that ($f_0$) of the conventional reel shown in FIG. 15 two maintain the dynamic balance of the rotary frame 13. Because the combined center of gravity in a group comprising the bail arm lever 15, the line roller 17 and the line slip 18 is located on the same plane perpendicular to the center of axis as that on which the center of gravity in the bail arm holder 19 is located, the position of the center of gravity c can be adjusted by changing the shape of the bail arm holder 19. For example, the center of gravity c of a bail arm holder 23 shown in FIG. 5 is located near the plane e on the opposite side of the bail arm 21 with respect to the plane a by forming large a part 23a holding the end of the bail arm 21 in comparison with the corresponding part shown in FIG. 4 in which the center of gravity c is located between the plane e and the plane a on the side of bail arm 21 with respect to the plane e. That is, the part 23a is formed so as to be projected or expanded on the opposite side of the bail arm with respect to the plane e so that the weight of the portion 23x, on the opposite side of the bail arm 21 with respect to the plane a, of the bail arm holder 23 is much heavier than the weight of the portion 23y, on the side of the bail arm 23 with respect to the plane a, of the bail arm holder 23. The center of gravity c of the bail arm holder 24 shown in FIG. 6 is located on the plane e. A bail arm holder 25 extended obliquely as shown in FIG. 7 has a part 25a located on the opposite side of the bail arm 21 with respect to the plane a and a part 25b located on the side of the bail arm 21, and the part 25a is much larger and heavier than the part 25b. Therefore, the center of gravity c is far away from the plane a on the opposite side of the bail arm with respect to the plane a. If the center of gravity c of the bail arm holder 25 is located at a position far away on the opposite side of the bail arm 21 from the plane a, unbalance caused by the weight of the bail arm 21 in the diametric direction of the rotary frame 13 can be decreased.

In this invention, the bail arm holder 19, 23, 24 or 25 is formed so as to extend forward from the pivot pin 20 when the fishline is wound on the spool 12, and the center of gravity c is located forward by the distance $f_1$ from the pivot pin 20. Therefore, suppose that an assembly of the support arms 14a, 14b, the bail arm lever 15, the roller 17 and the line slip 18 is divided into two groups by the plane a; the center of gravity in one of the two groups is located near, in the axial direction, the center of gravity in the other of the two groups thereby to improve the dynamic balance of the rotary frame 13 in the axial direction. Further, the bail arm holder 19, 23, 24 or 25 is extended long from their pivot pins 16, 20, so that the part, on the opposite side of the bail arm 21 with respect to the plane a, of the bail arm holder is heavier than that, on the side of the bail arm 21 with respect to the plane a, the bail arm holder. Therefore, the quantity of offset can be set less than that of a conventional spinning reel to enable the length of the bail arm 21 short thereby to prevent the deformation of the bail arm. Further, the generation of strain on the rotary frame 13 can be decreased when it is manufactured.

Next, a second embodiment will now be explained with reference to FIGS. 8 to 9.

Figure 8:
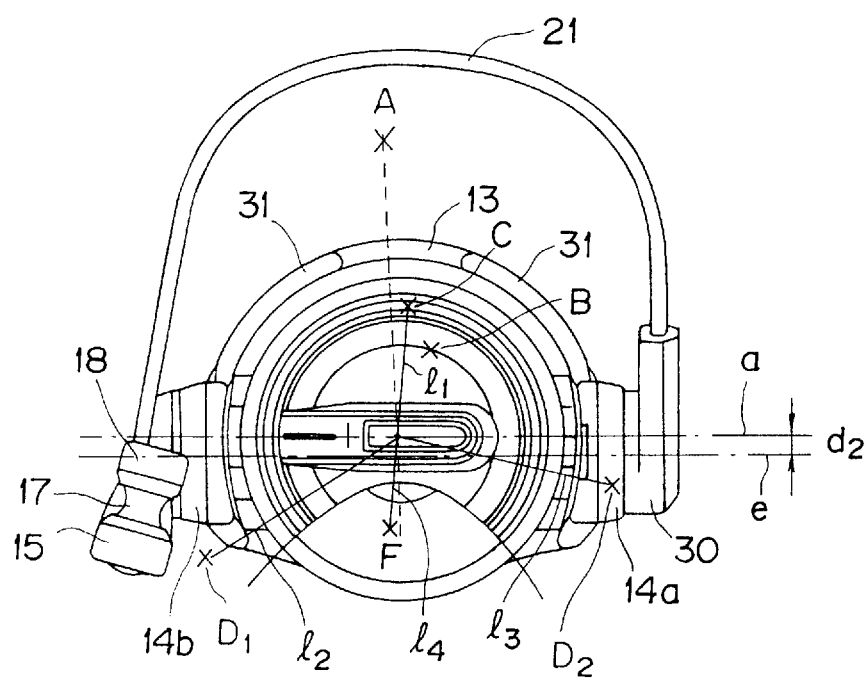
FIG. 8 is a front view of another spinning reel with a balancing portion according to the present invention.
Figure 9:
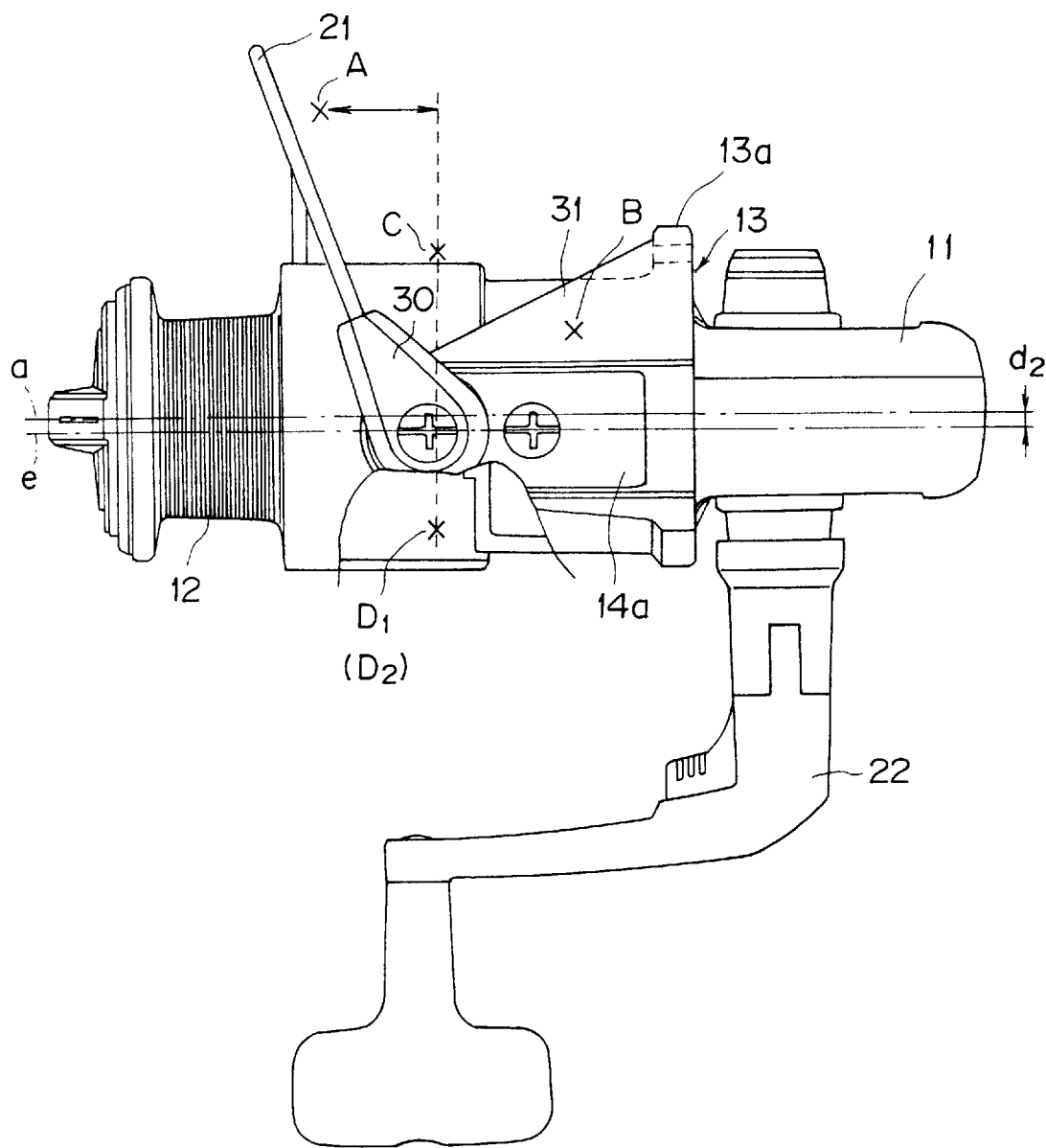
FIG. 9 is a side view of the spinning reel shown in FIG. 8.
Figure 10:
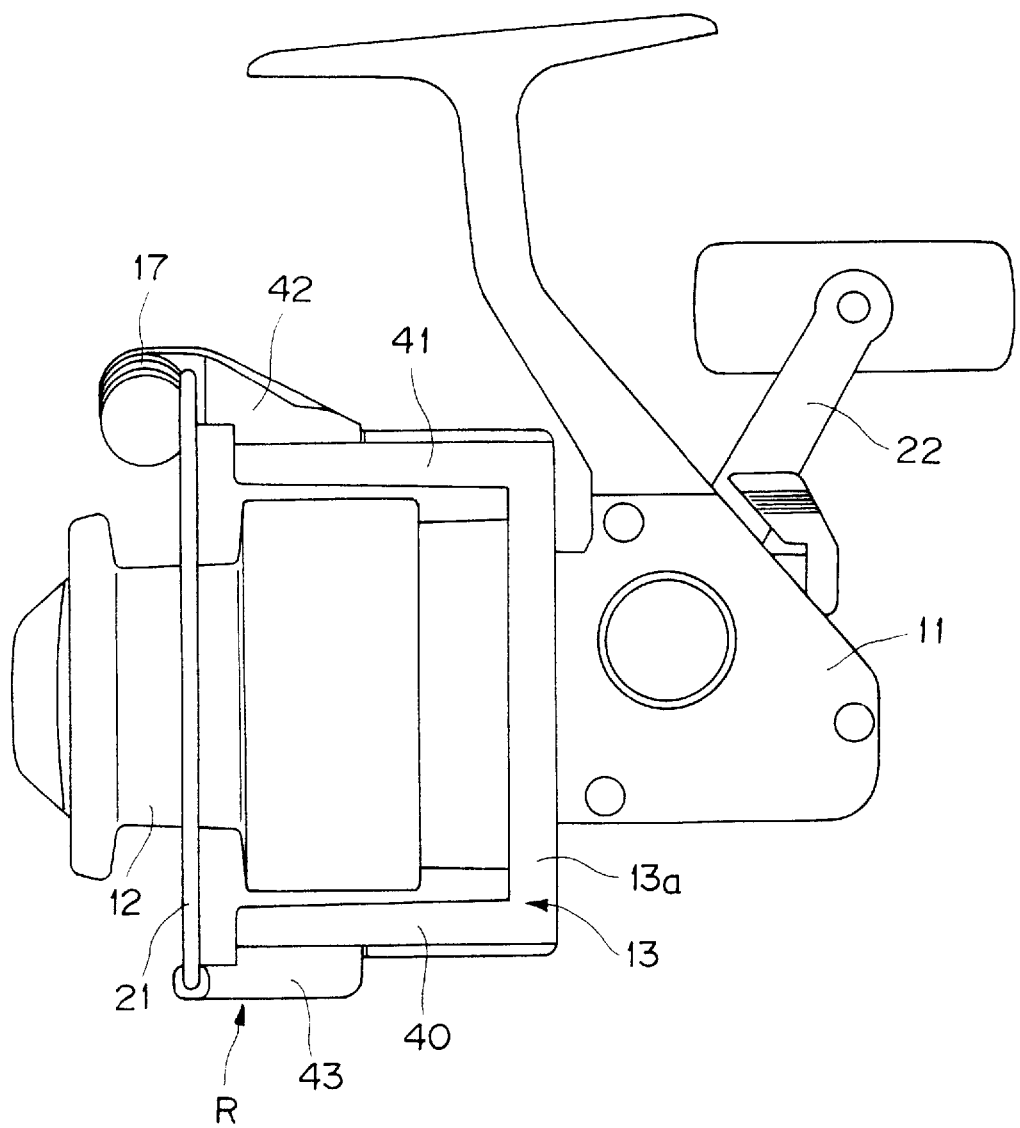
FIG. 10 is a side view of still another spinning reel according to the present invention.

The rotary frame 13 has, as shown in FIGS. 8 and 9, two balancing portions 31, 31 which are integrally extended from the flange portion 13a of the rotary frame 13 in the axial direction of the reel along the support arms 14a, 14b, respectively, to form two triangle weight members. The balancing portions 31, 31 are disposed on the side of the bail arm 21 with respect to the plane a in its winding condition. The distal end of the support arm 14a has a conventional bail arm holder 30 and the plane e is deviated by the distance $d_2$ from the plane a.

Suppose that the rotational center of gravity of the bail arm 21 is located at a position A in the axial direction of the reel, and the combined rotational center of gravity in a group comprising the balancing portions 31, 31 and the portions, on the side of the bail arm 21, of the support arms 14a, 14b, the bail arm holder 30 and the bail arm lever 15 is located at a position B in the axial direction of the reel. A combined center of gravity of the center of the gravity A with the center of gravity B is thus located at a position C in the axial direction of the reel. If the balancing portions 31, 31 are determined at a proper position and at a proper weight, the combined center of gravity C can be desirably adjusted.

Further, the combined rotational center of gravity in a group comprising the portions, on the opposite side of the bail arm 21 with respect to the plane a, of the support arm 14b and the bail arm lever 15, the roller 17 and the line slip 18 is determined at a position $D_1$, and the combined rotational center of gravity in a group comprising the portions, on the opposite side of the bail arm 21 with respect to the plane a, of the support arm 14a and the bail arm holder 30 is determined at a position D2 in the axial direction of the reel because of the quantity of offset $d_2$. The two positions $D_1$ and $D_2$ are placed on the same plane which is perpendicular to the center axis o and passes the position C. That is, the three positions $D_1$, $D_2$ and C are placed on the same plane perpendicular to the center axis o. If the weights at those three positions $D_1$, $D_2$ and C are properly determined, the rotational balance of the rotary frame 13 can be desirably adjusted to obtain a spinning reel without deviation during rotation. In addition, if the distance between the position C and the center axis o is $l_1$, the distance between the position $D_1$ and the center axis o is $l_2$, the distance between the position $D_2$ and the center axis o, is $l_3$ and the weights at the positions C, $D_1$ and $D_2$ are $W_1$, $W_2$ and $W_3$, respectively, the relationship between those weights $W_1$, $W_2$ and $W_3$ and the respective distances $l_1$, $l_2$ and $l_3$ is determined in the following manner.

$$(W_1 \times l_1) = (W_2 \times l_2) + (W_3 \times l_3)$$

If those three positions C, $D_1$ and $D_2$ are determined in this manner, the dynamic balance of the rotary frame 13 is remarkably improved.

If a combined center of gravity of the center of gravity $D_1$ and the center of gravity $D_2$ is located at a position F and the distance between the center axis o and the position F is $l_4$, the following equation is obtained.

$$W_1 \times l_1 = (W_2 + W_3) l_4$$

A balancing portion may be disposed at a desired position on the rotary frame 13 instead of the balancing portions 31. In the second embodiment, the bail arm holder 19, 23, 24 or 25 may be used instead of the holder 30.

A third embodiment will now be explained with reference to FIGS. 10 to 13. As shown in FIGS. 10 to 13, two support arms 40, 41 for supporting a bail arm holder 43 which is similar to the holder 19 (FIG. 4) and a bail arm lever 42, respectively, are extended forward from the flange 13a of the rotary frame 13 in an oblique manner in the opposite direction of the bail arm. 21 with respect to the plane a.

Figure 11:
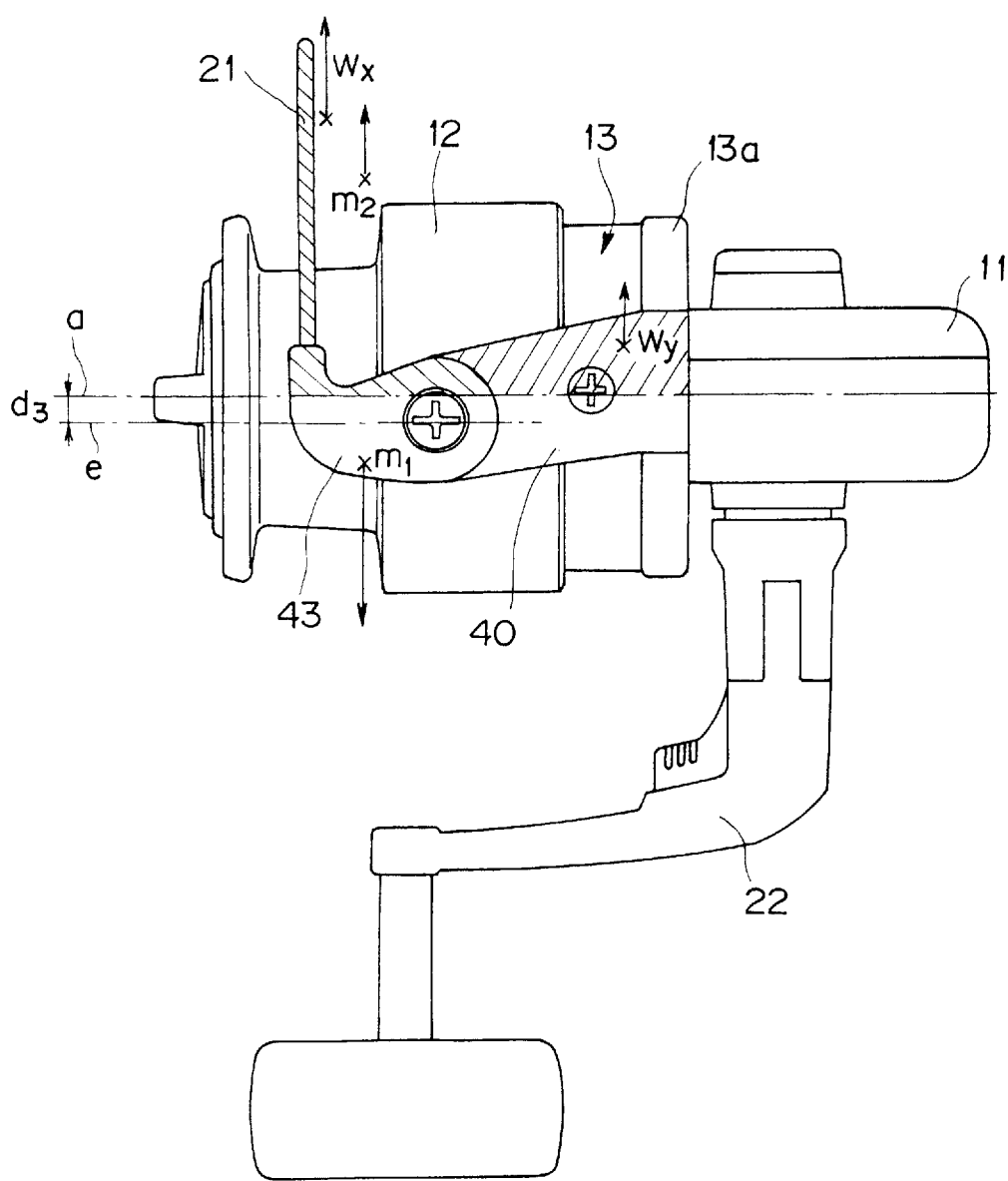
FIG. 11 is a plan view of the spinning reel shown in FIG. 10.
Figure 12:
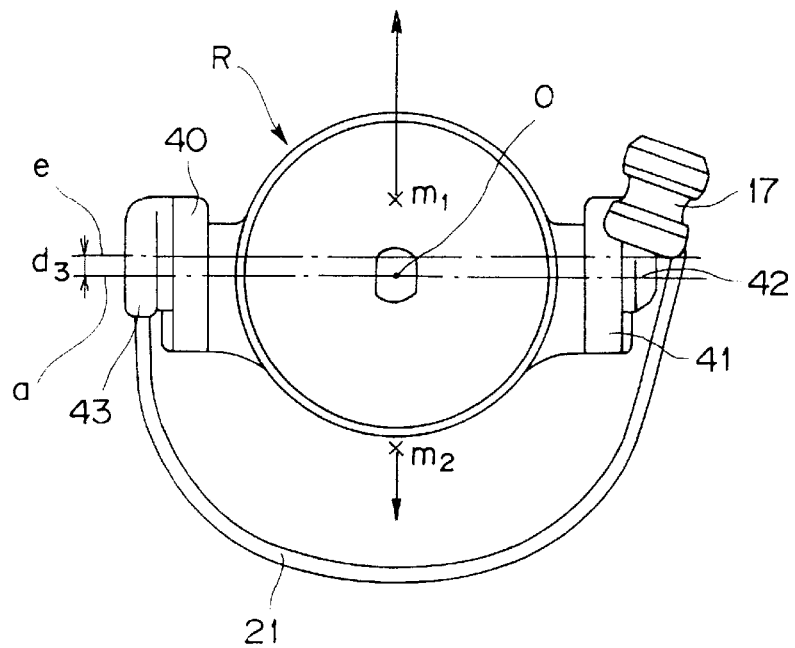
FIG. 12 is a front view of a rotary frame of the spinning reel shown in FIG. 11.
Figure 13:
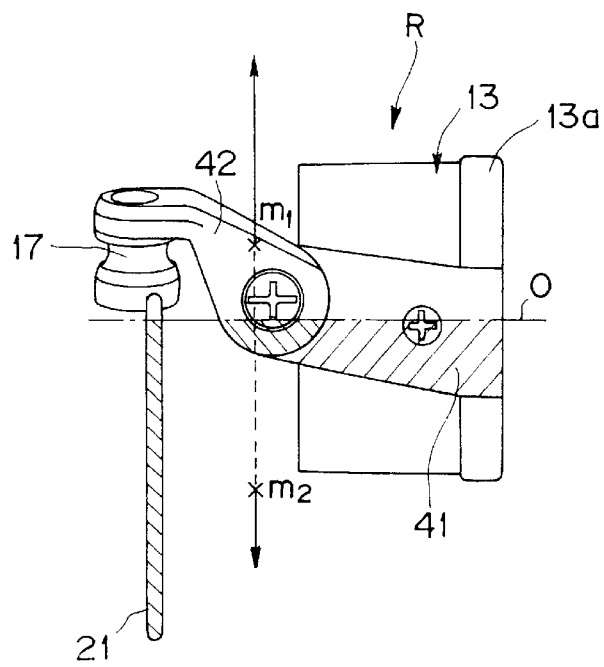
FIG. 13 is a side view of the rotary frame shown in FIG. 12.
Figure 14:
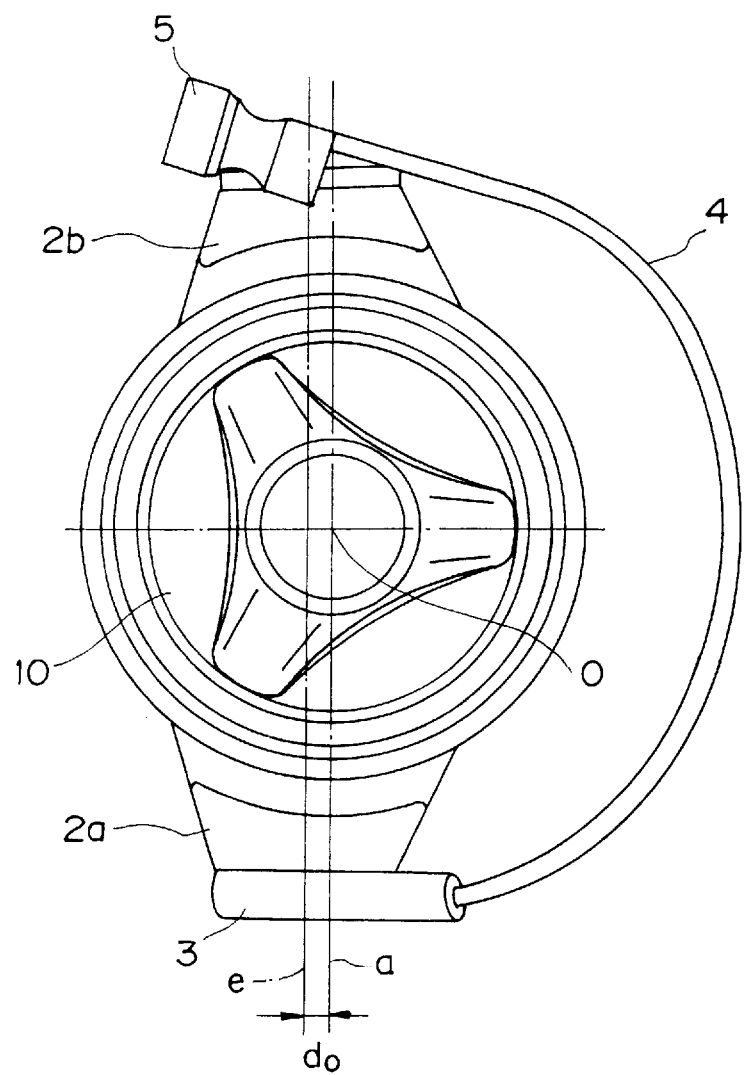
FIG. 14 is a front view of a conventional spinning reel.

The rotary frame 13, the bail arm lever 42, the bail arm holder 43, the bail arm 21, the line roller 17 etc., form a rotary body R for rotating around the spool 12. Suppose that the center of gravity in a group comprising the bail arm 21 and the portion, on the side of the bail arm 21 with respect to the plane a, of the bail arm lever 42 and the portion, on the side of the bail arm 21, of the bail arm holder 43 is $W_x$, the center of gravity of the portions, on the side of the bail arm 21, of the two support arms 40, 41 is $W_y$, and the combined center of gravity of the center of gravity $W_x$ and the center of the gravity $W_y$ is $m_2$ as shown in FIGS. 11 to 13. Further, suppose that the combined center of gravity in a group comprising the portions, on the opposite side of the bail arm 21 with respect to the plane a, of the bail arm lever 42 and holder 43 and the two support arms 40, 41 is $m_1$. Those centers of gravity $m_1$ and $m_2$ are placed on the same plane which is perpendicular to the plane a. The inclined angle of the support arms 40, 41, the quantity of offset $d_3$ and the weight of each member are adjusted so that the product of the weight at the center of gravity $m_1$ and the distance between the center axis o and the center of gravity $m_1$ equals to the product of the weight at the center of gravity $m_2$ and the distance between the center axis o and the center of gravity $m_2$. Thus, a centrifugal force at the center of gravity $m_1$ cancels a centrifugal force at the center of gravity $m_2$ thereby to ensure the rotation of the reel in a balanced condition.

If the reel is balanced in rotation without any independent balancer, the weight of the reel can be decreased in addition to the decrease of the number of parts.

What is claimed is:

1. A spinning reel comprising:

a main body;

a rotary frame mounted on the main body for rotating about a longitudinal axis;

a pair of support arms having attachment ends affixed to opposite sides of the rotary frame and distal ends disposed axially forward of the attachment ends; and a bail assembly having a bail arm holder pivotally mounted on the distal end of one of the support arms, a bail arm lever pivotally mounted on the distal end of the other of the support arms, and a bail arm affixed to and extending between the bail arm holder and the bail arm lever, the bail arm holder and the bail arm lever being pivotable about a common bail axis perpendicular to the longitudinal axis for allowing the bail assembly to swing between a winding position in which a fish line is wound on a spool and a play out position in which the fish line is played out from the spool, the bail arm in the winding position being substantially disposed on a bail side of a first plane which is parallel to the bail axis and includes the longitudinal axis, the bail arm lever being equipped with a line roller and a line slip for guiding the fish line, wherein the bail arm holder , in the winding position , includes a rear portion having a semicircular contour around the bail axis, a front portion extended along a center axis of an end portion of the bail arm to hold the end portion of the bail arm, and a middle portion interposed between the rear portion and the front portion and extended forward along the first plane, with respect to a direction parallel to the longitudinal axis, and wherein the middle portion causes an intersection point at which an imaginary straight line extended from the center line of the end portion of the bail arm intersects a second plane including the bail axis and parallel to the first plane to be apart from an imaginary circle described alone the contour of the rear portion.

2. The spinning reel of claim 1, wherein the bail axis is deviated to an antibail side of the first plane opposite to the bail side.

3. The spinning reel of claim 1, wherein the center of gravity of the bail arm holder is disposed on an antibail side of the first plane opposite to the bail side.

4. The spinning reel of claim 1, wherein the two support arms are extended from their attachment ends to their distal ends while being generally inclined toward an antibail side of the first plane opposite to the bail side;

wherein each of the bail assembly in the winding position and the two support arms comprises a first portion disposed on the antibail side and a second portion disposed on the bail side, a first combined center of gravity of a first group consisting of each first portion being located on the same plane perpendicular to the longitudinal axis as that on which a second combined center of gravity of a second group consisting of each second portion is located; and wherein a product of the weight of the first group and a distance between the first combined center and the longitudinal axis is equal to a product of the weight of the second group and a distance between the second combined center and the longitudinal axis.

* * * * *

UNITED STATES PATENT AND TRADEMARK OFFICE
CERTIFICATE OF CORRECTION

PATENT NO. : 5,842,656
DATED : December 1, 1998
INVENTOR(S) : ATSUHITO AOKI, et al.

It is certified that error appears in the above-identified patent and that said Letters Patent is hereby corrected as shown below:

Column 8, Line 15, Claim 1, delete "alone" and insert -- along--.

Signed and Sealed this

Fourth Day of May, 1999

Attest:

Q. TODD DICKINSON

Attesting Officer

Acting Commissioner of Patents and Trademarks